US012436383B2

(12) United States Patent
Nakadoi

(10) Patent No.: US 12,436,383 B2
(45) Date of Patent: Oct. 7, 2025

(54) VIBRATION DEVICE

(71) Applicant: Murata Manufacturing Co., Ltd., Nagaokakyo (JP)

(72) Inventor: Takahide Nakadoi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1166 days.

(21) Appl. No.: 17/320,282

(22) Filed: May 14, 2021

(65) Prior Publication Data

US 2021/0325667 A1 Oct. 21, 2021

Related U.S. Application Data

(63) Continuation of application No. PCT/JP2020/041578, filed on Nov. 6, 2020.

(30) Foreign Application Priority Data

Apr. 17, 2020 (JP) .................................. 2020-074332

(51) Int. Cl.
*G02B 27/00* (2006.01)
*B06B 1/06* (2006.01)
*B08B 7/02* (2006.01)

(52) U.S. Cl.
CPC ........ *G02B 27/0006* (2013.01); *B06B 1/0651* (2013.01); *B08B 7/028* (2013.01); *B06B 2201/77* (2013.01)

(58) Field of Classification Search
CPC ... G02B 27/0006; B06B 1/0651; B08B 7/028; H10N 30/88

USPC .......................................................... 359/507
See application file for complete search history.

(56) References Cited

U.S. PATENT DOCUMENTS

| 2,202,697 | A | * | 5/1940 | La Hodny | G02B 5/08 52/204.597 |
| 2,307,568 | A | * | 1/1943 | Colbert | B60R 1/02 248/482 |
| 4,586,787 | A | * | 5/1986 | Fiandra | G02B 7/026 359/830 |
| 4,778,253 | A | * | 10/1988 | Siga | G02B 7/025 156/89.15 |

(Continued)

FOREIGN PATENT DOCUMENTS

| CN | 109922897 A | 6/2019 |
| JP | 2010-134378 A | 6/2010 |

(Continued)

OTHER PUBLICATIONS

Norland Products, Inc., "Norland Optical adhesives", https://www.norlandprod.com/adhesiveindex2.html, retrieval dated Dec. 18, 2024, pp. 1-9. (Year: 2024).*

(Continued)

*Primary Examiner* — Ricky D Shafer
(74) *Attorney, Agent, or Firm* — Keating & Bennett, LLP

(57) ABSTRACT

A vibration device includes a cover glass including an inclined surface defined by a chamfered outer peripheral edge of the cover glass, a vibration body bonded to the cover glass with an adhesive and causing the cover glass to vibrate, and a retainer bonded to the cover glass with an adhesive and fixed to the vibration body and that is in contact with the inclined surface of the cover glass so as to support an outer peripheral edge of the cover glass.

18 Claims, 9 Drawing Sheets

(56) References Cited

U.S. PATENT DOCUMENTS

| | | | | |
|---|---|---|---|---|
| 5,007,722 A * | 4/1991 | Mori | ................ | B60R 1/0602 359/507 |
| 5,299,060 A * | 3/1994 | Mori | ................ | B08B 17/02 359/507 |
| 5,446,591 A * | 8/1995 | Medlock | ................ | G02B 3/12 359/830 |
| 5,793,530 A * | 8/1998 | Lang | ................ | B60R 1/02 359/884 |
| 5,798,876 A * | 8/1998 | Nagano | ................ | G02B 7/021 359/819 |
| 7,002,139 B2 * | 2/2006 | Stallard | ................ | H10F 77/50 359/512 |
| 7,079,332 B2 * | 7/2006 | Tanaka | ................ | G02B 7/023 359/822 |
| 7,486,326 B2 * | 2/2009 | Ito | ................ | B08B 7/02 359/507 |
| 8,107,810 B2 * | 1/2012 | Matsumoto | ................ | H04N 23/52 359/507 |
| 12,016,248 B2 * | 6/2024 | Kishi | ................ | H10N 30/87 |
| 2004/0212903 A1 * | 10/2004 | Nogami | ................ | G02B 7/025 359/811 |
| 2005/0122600 A1 * | 6/2005 | Yoshizawa | ................ | G02B 7/025 359/819 |
| 2007/0188699 A1 * | 8/2007 | Cech | ................ | G02B 7/021 351/159.02 |
| 2010/0158501 A1 * | 6/2010 | Kawai | ................ | H04N 23/811 15/94 |
| 2013/0100531 A1 * | 4/2013 | Shimada | ................ | B08B 7/02 15/94 |
| 2013/0235458 A1 * | 9/2013 | Kawai | ................ | H04N 23/811 359/507 |
| 2013/0301148 A1 * | 11/2013 | Breidenthal | ................ | G02B 23/2476 359/819 |
| 2013/0301149 A1 * | 11/2013 | Breidenthal | ................ | G02B 23/2476 359/819 |
| 2013/0342906 A1 * | 12/2013 | Dahmen | ................ | G02B 27/0006 359/513 |
| 2015/0293330 A1 * | 10/2015 | Gutierrez | ................ | G03B 43/00 359/811 |
| 2015/0316742 A1 * | 11/2015 | Jono | ................ | G02B 23/2476 359/830 |
| 2016/0266379 A1 * | 9/2016 | Li | ................ | B08B 7/028 |
| 2018/0095272 A1 * | 4/2018 | Fujimoto | ................ | G03B 17/56 |
| 2018/0117642 A1 * | 5/2018 | Magee | ................ | G01H 1/00 |
| 2018/0194328 A1 | 7/2018 | Numakunai | | |
| 2018/0292646 A1 | 10/2018 | Fujimoto | | |
| 2020/0057301 A1 | 2/2020 | Kuratani et al. | | |
| 2020/0284741 A1 * | 9/2020 | Magee | ................ | B06B 1/0292 |
| 2023/0244128 A1 * | 8/2023 | Van Den Brink | ................ | G03B 17/02 359/820 |
| 2023/0258925 A1 * | 8/2023 | Nakadoi | ................ | G02B 27/0006 356/507 |

FOREIGN PATENT DOCUMENTS

| | | |
|---|---|---|
| JP | 2017-022451 A | 1/2017 |
| JP | 2017-170303 A | 9/2017 |
| WO | 2017/149933 A1 | 9/2017 |
| WO | 2018/198465 A1 | 11/2018 |

OTHER PUBLICATIONS

Official Communication issued in International Patent Application No. PCT/JP2020/041578, mailed on Dec. 12, 2020.

Office Action in CN202080006928.4, mailed Sep. 26, 2022, 8 pages.

* cited by examiner

VIBRATION DEVICE

CROSS REFERENCE TO RELATED APPLICATIONS

This application claims the benefit of priority to Japanese Patent Application No. 2020-074332 filed on Apr. 17, 2020 and is a Continuation Application of PCT Application No. PCT/JP2020/041578 filed on Nov. 6, 2020. The entire contents of each application are hereby incorporated herein by reference.

BACKGROUND OF THE INVENTION

1. Field of the Invention

The present invention relates to a vibration device that removes liquid droplets on a cover glass by vibration.

2. Description of the Related Art

In the related art, there is known a liquid-droplet removal device for removing liquid droplets on a dome-shaped drip-proof cover of an optical element (see, for example, Japanese Unexamined Patent Application Publication No. 2017-170303). In this liquid-droplet removal device, a liquid-droplet removal piezoelectric element is bonded and fixed to a dome-shaped liquid-droplet cover. The piezoelectric element is an excitation member for causing vibration of the drip-proof cover. In contrast, the drip-proof cover is equipped with a ring-shaped drip-proof seal that is made of rubber and that is disposed so as to be closely fitted to the entire periphery of the drip-proof cover. The drip-proof seal has a vibration absorbing property.

However, in the above-described liquid-droplet removal device, the drip-proof seal is made of rubber, and the drip-proof cover and the piezoelectric element cannot be securely held. In addition, since the drip-proof seal has a vibration absorbing property, the drip-proof seal has become a factor that causes vibration loss when vibration of the piezoelectric element is transmitted to the drip-proof cover.

SUMMARY OF THE INVENTION

Preferred embodiments of the present invention provide vibration devices that are each capable of securely holding a drip-proof cover glass and a vibration body and reducing or preventing vibration loss.

A vibration device according to a preferred embodiment of the present invention includes a cover glass that includes an inclined surface defined by a chamfered outer peripheral edge of the cover glass, a vibration body bonded to the cover glass with an adhesive and that causes the cover glass to vibrate, and a retainer bonded to the cover glass with an adhesive and fixed to the vibration body and that is in contact with the inclined surface of the cover glass to support an outer peripheral edge of the cover glass.

With vibration devices according to preferred embodiments of the present invention, by providing adhesive and mechanical fixation, a cover glass and a vibration body of each of the vibration devices are able to be securely held, and vibration loss is able to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
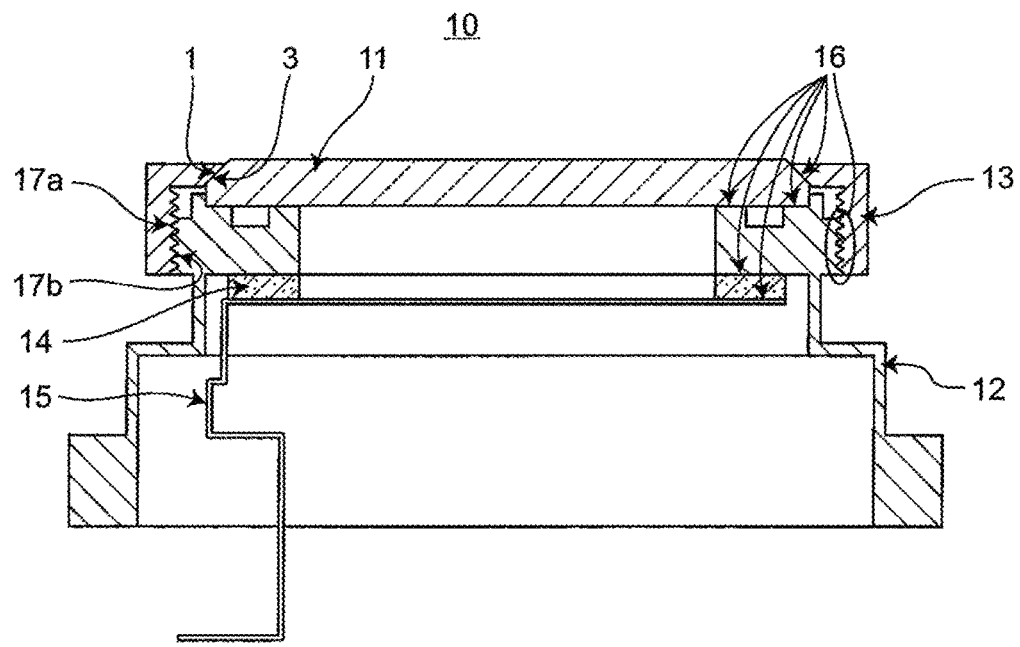
FIG. 1A is a schematic sectional view of a vibration device according to a first preferred embodiment of the present invention.

A vibration device according to a preferred embodiment of the present invention includes a cover glass that includes an inclined surface defined by a chamfered outer peripheral edge of the cover glass, a vibration body that is bonded to the cover glass with an adhesive and that causes the cover glass to vibrate, and a retainer that is bonded to the cover glass with an adhesive and fixed to the vibration body and that is in contact with the inclined surface of the cover glass to support an outer peripheral edge of the cover glass.

In a vibration device according to a preferred embodiment of the present invention, the retainer may include an inclined surface that is in surface contact with the inclined surface of the cover glass.

In a vibration device according to a preferred embodiment of the present invention, the cover glass may include an inclined surface that is defined by a chamfered outer peripheral edge of the cover glass at an angle from about 5 degrees to about 85 degrees with respect to a horizontal surface.

According to the above-described configurations, the cover glass can be pressed in an oblique direction and further securely held. In addition, the cover glass can be accurately positioned to the center or approximate center of the vibration body.

In a vibration device according to a preferred embodiment of the present invention, the retainer may be a portion of the vibration body.

In a vibration device according to a preferred embodiment of the present invention, the retainer and the vibration body may each be threaded and may be fitted to each other, and the cover glass may be clamped between the retainer and the vibration body so as to be fixed in place.

With each of the above-described configurations, the cover glass is clamped between the retainer and the vibration body, so that the vibration body and the cover glass are securely held, and vibration of the vibration body can be transmitted to the glass without a loss.

In a vibration device according to a preferred embodiment of the present invention, the retainer may be fixed to the vibration body by screw clamping.

In a vibration device according to a preferred embodiment of the present invention, the retainer may be fixed to an outer peripheral edge of a bottom surface of the vibration body in a snap-fit manner.

In a vibration device according to a preferred embodiment of the present invention, the cover glass may be made of tempered glass.

According to the above-described configurations, the harder the cover glass, the smaller the vibration propagation loss.

A vibration-device-equipped imaging device according to a preferred embodiment of the present invention includes an imaging device including an optical element and a vibration device according to a preferred embodiment of the present invention, and the vibration device is disposed such that a front surface of the optical element of the imaging device is covered with the cover glass of the vibration device.

The vibration devices according to the preferred embodiments will be described below with reference to the drawings. Note that, in the drawings, features and elements that are the same or substantially the same as each other are denoted by the same reference signs.

First Preferred Embodiment

Figure 1B:
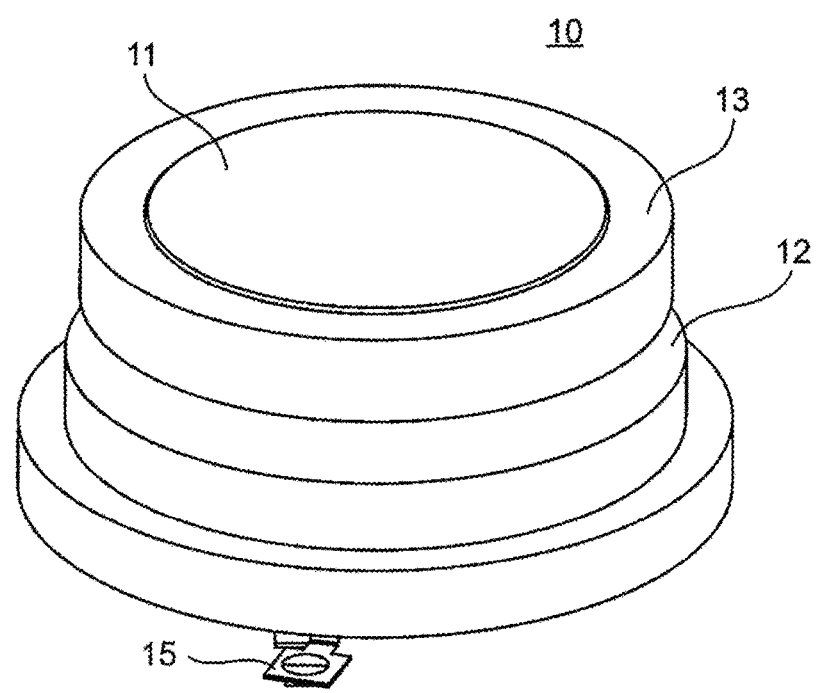
FIG. 1B is a schematic perspective view of the vibration device illustrated in FIG. 1A.
Figure 2:
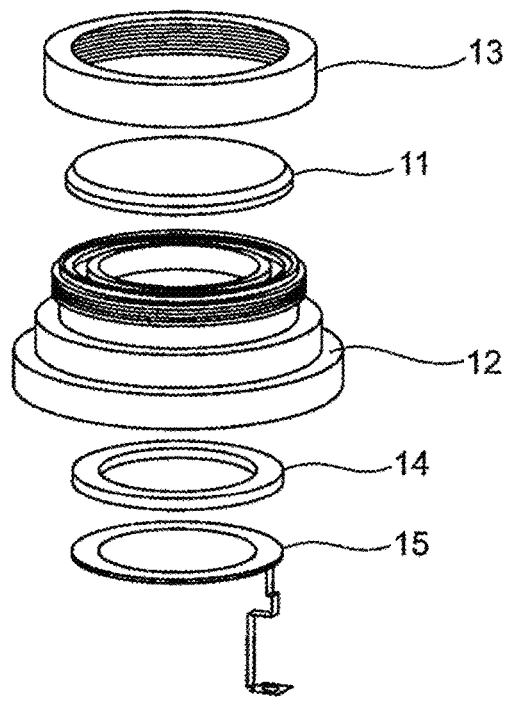
FIG. 2 is an exploded perspective view of component members of the vibration device illustrated in FIG. 1A.
Figure 3:
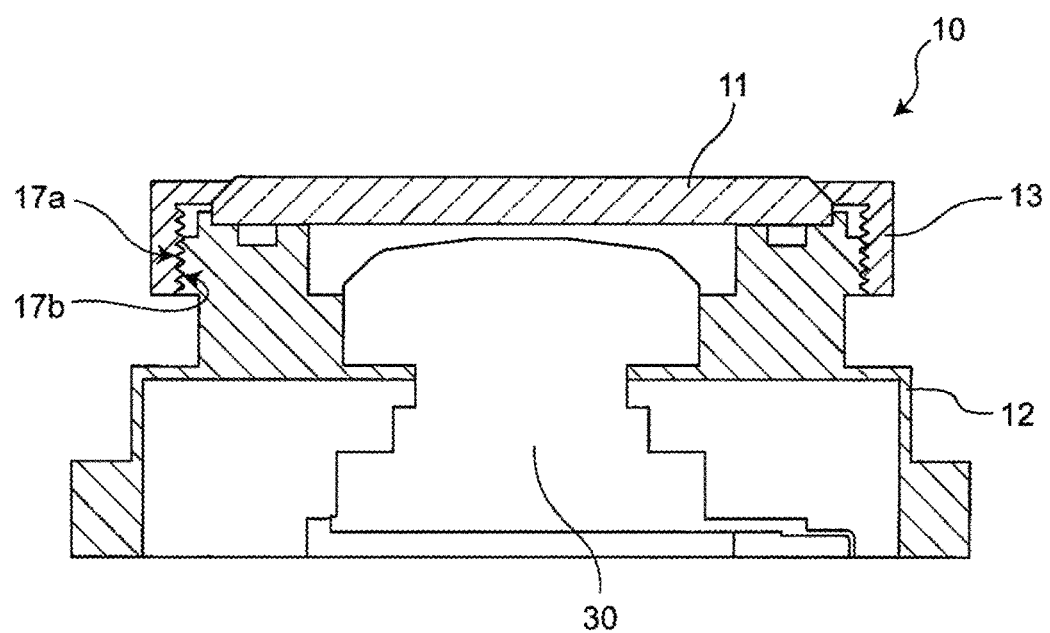
FIG. 3 is a schematic sectional view of a sectional configuration of a vibration-device-equipped imaging device that is obtained by mounting the vibration device according to the first preferred embodiment of the present invention onto an imaging device.

FIG. 1A is a schematic sectional view illustrating a vibration device 10 according to a first preferred embodiment of the present invention. FIG. 1B is a schematic perspective view of the vibration device 10 illustrated in FIG. 1A. FIG. 2 is an exploded perspective view of component members of the vibration device 10 illustrated in FIG. 1A. FIG. 3 is a schematic sectional view of a vibration-device-equipped imaging device that is obtained by mounting the vibration device 10 according to the first preferred embodiment onto an imaging device 30.

The vibration device 10 according to the first preferred embodiment includes a cover glass 11, a vibration body 12 that causes the cover glass 11 to vibrate, and a retainer 13 that is supported at the outer peripheral edge of the cover glass 11. The cover glass 11 includes an inclined surface 1 that is defined by a chamfered outer peripheral edge of the cover glass 11. The vibration body 12 is bonded to the cover glass 11 with an adhesive 16. The retainer 13 is bonded to the cover glass 11 with the adhesive 16 and fixed to the vibration body 12. In addition, the retainer 13 is in contact with the inclined surface 1 of the cover glass 11 and is supported at the outer peripheral edge of the cover glass 11.

Note that, for example, the vibration device 10 is disposed such that the front surface of an optical element of the imaging device 30 is covered with the cover glass 11 of the vibration device 10 as illustrated in FIG. 3, so that the vibration-device-equipped imaging device can be provided. The imaging device 30 includes, for example, the optical element, an imaging element, a sensor component, and the like provided therein and also includes a case component in which these components are disposed.

According to the vibration device 10 of the first preferred embodiment, by using the adhesive 16 and mechanical fixation together to fix the cover glass 11 and the vibration body 12 to each other, the cover glass 11 and the vibration body 12 can be securely held, and vibration loss can be reduced or prevented.

The members included in the vibration device 10 will be described below.

Cover Glass

The cover glass 11 includes the inclined surface 1 defined by a chamfered outer peripheral edge of the cover glass 11 at about 45 degrees, for example. Examples of the material of the cover glass 11 include, for example, soda glass, borosilicate glass, aluminosilicate glass, and so forth. In addition, the cover glass 11 may be tempered glass with increased strength provided by chemical strengthening or the like, for example. A surface of the cover glass 11 may be coated with, for example, AR coating, water-repellent coating, or impact-resistant coating, as necessary. The chamfered inclined surface 1 is inclined toward the outer periphery. Although the chamfer angle of the inclined surface 1 is, for example, 45 degrees, the chamfer angle is not limited to this and may be within a range of, for example, about 5 degrees to about 85 degrees with respect to a horizontal surface.

Although the shape of the cover glass 11 in plan view is, for example, a circular or substantially circular shape as illustrated in FIG. 1B, the shape of the cover glass 11 is not limited to this. For example, the shape of the cover glass 11 in plan view may be a polygonal shape such as a quadrangular shape, a hexagonal shape, or an octagonal shape or an elliptical shape.

Vibration Body

An external thread 17a is cut on the vibration body 12. Examples of the material of the vibration body 12 include, for example, metals such as a stainless steel, aluminum, iron, titanium, and duralumin. In order to reduce vibration loss, it is preferable that the rigidity of the vibration body 12 be as high as possible. In order to increase the adhesive strength of the adhesive 16, it is preferable that a surface of the vibration body 12 is subjected to an oxidation treatment or an alumite treatment.

Note that the vibration body 12 receives vibration from a piezoelectric body 14.

Retainer

An internal thread 17b is cut on the retainer 13. The internal thread 17b is designed to be fitted to the external thread 17a of the vibration body 12 and is tightened by rotating the retainer 13. Examples of the material of the retainer 13 include metals such as a stainless steel, aluminum, iron, titanium, and duralumin, and plastic. The surface of the retainer 13 is the same as or similar to that of the vibration body 12. However, the retainer 13 is not necessarily threaded, and various structures such as, for example, fixed fitting and laser welding may be used as long as the retainer 13 can be strongly fixed to the vibration body 12.

An inclined surface 3 that is chamfered at about 45 degrees, for example, is provided inside the retainer 13, and the retainer 13 has a structure in which the inclined surface 3 obliquely presses the chamfered inclined surface 1 of the cover glass 11 by being in contact with the chamfered inclined surface 1. The inclined surface 3 of the retainer 13 is positioned so as to face and be in contact with the inclined surface 1 of the cover glass 11, so that the cover glass 11 can be stably supported. However, the angle of the inclined surface 3 is not necessarily about 45 degrees as long as it is the same or substantially the same as the chamfer angle of the inclined surface 1 of the cover glass 11. By setting the angle of the inclined surface 3 to be the same or substantially the same as the angle of the inclined surface 1 of the cover glass 11, the inclined surface 3 of the retainer 13 can come into surface contact with the inclined surface 1 of the cover glass 11, and the cover glass 11 can be further stably supported.

Note that, by fitting the threads of the retainer 13 and the vibration body 12 together and rotating the retainer 13, the inclined surface 3 of the retainer 13 presses the inclined surface 1 of the cover glass 1 from above. As a result, the cover glass 11 receives a force in the top-to-bottom direction and a force from the outer periphery thereof toward the center thereof and is mechanically stably fixed in place and centered.

Although the outer periphery of the retainer 13 has a circular or substantially circular shape as illustrated in FIG. 1B, the outer periphery of the retainer 13 is not limited to this shape. For example, the outer periphery of the retainer 13 may have a polygonal shape, an elliptical shape, or a shape with a notch for a screwdriver as long as the shape corresponds to the shape of the cover glass 11 in plan view.

In the case where a material having a greater specific gravity than that of the cover glass 11 is used for the retainer 13, the position of the center of gravity can be set to be located outside the outer periphery of the cover glass 11, and as a result, an adjustment, such as increasing the amplitude domain of the cover glass 11, for example, can be performed.

Adhesive

The adhesive 16 is applied between the cover glass 11 and the retainer 13, between the retainer 13 and the vibration body 12, and between the cover glass 11 and the vibration body 12. The material of the adhesive 16 is a hard material such as, for example, an epoxy resin. In order to reduce vibration loss, it is preferable that the Young's modulus is high.

Piezoelectric Body

The piezoelectric body 14 is fixed to the vibration body 12 with the adhesive 16. The material of the piezoelectric body 14 is preferably, for example, a ceramic.

In order to apply an electric potential to an electrode of the piezoelectric body 14 that is located in a lower portion of the piezoelectric body 14, a wiring line 15 is fixed to the piezoelectric body 14 with the adhesive 16. The material of the wiring line 15 is, for example, a highly conductive metal such as a stainless steel or copper. The wiring line 15 may be, for example, a flexible printed circuit (FPC). An FPC is a technology that has been widely used, and in a representative example of the FPC, a wiring line made of a copper foil, for example, is provided on a polyimide substrate.

The piezoelectric body 14 ultrasonically vibrates, and thus, if a wiring line made of a stainless steel, copper, or the like, for example, is directly attached to the piezoelectric body 14, vibration loss may occur. In contrast, the FPC has flexibility, and thus, an electric potential can be applied to the piezoelectric body 14 without hindering vibration.

Note that a configuration may be provided in which stress that is applied to the piezoelectric body 14 at the time of vibration displacement is reduced by the peripheral components. As a result, the displacement of the cover glass 11 linearly increases with respect to the voltage input to the piezoelectric body 14, and a favorable foreign-matter removal performance can be obtained.

Comparison of Vibration Device of Related Art and Vibration Device According to First Preferred Embodiment In a configuration of a vibration device of the related art, a cover glass and a vibration body are bonded to each other using only an adhesive. However, there has been a problem in that such fixation using only an adhesive results in insufficient integration of two components, which are the cover glass and the vibration body, and leads to a loss in propagation of vibration from the vibration body to the cover glass.

Figure 5A:
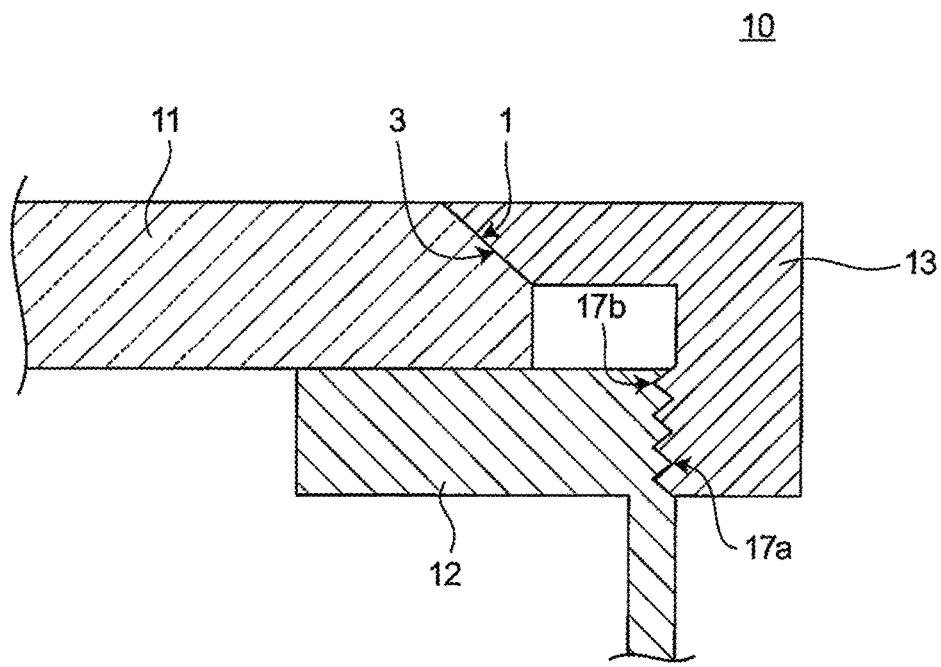
FIG. 5A is a schematic partial sectional view of a sectional structure of the vibration device according to the first preferred embodiment of the present invention including an end portion of the cover glass, an end portion of a vibration body, and an end portion of the retainer.
Figure 5B:
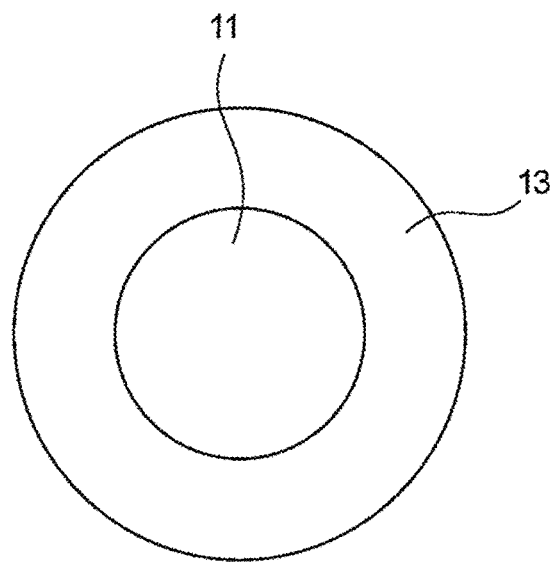
FIG. 5B is a plan view of the vibration device illustrated in FIG. 5A.

FIG. 5A is a schematic partial sectional view illustrating a sectional structure of the vibration device 10 according to the first preferred embodiment including an end portion of the cover glass 11, an end portion of the vibration body 12, and an end portion of the retainer 13. FIG. 5B is a plan view of the vibration device 10 illustrated in FIG. 5A.

As illustrated in FIG. 1A and FIG. 5A, in the vibration device 10 according to the first preferred embodiment, the cover glass 11 and the vibration body 12 are bonded to each other with the adhesive 16. The vibration body 12 and the retainer 13 are bonded to each other with the adhesive 16 and mechanically fixed to each other. More specifically, the vibration body 12 and the retainer 13, each of which is threaded, are fitted to each other, so that they are mechanically fixed to each other. Note that the mechanical fixation is not limited to threading. In addition, the retainer 13 and the cover glass 11 are bonded to each other with an adhesive, and the inclined surface 1 of the cover glass 11 and the inclined surface 3 of the retainer 13 are in contact with each other, so that the outer peripheral edge of the cover glass 11 is supported by the retainer 13.

The vibration device 110 is obtained by, for example, the following manufacturing method. First, the adhesive 16 is injected into a space between the cover glass 11 and the vibration body 12. Next, before the adhesive 16 is cured, the retainer 13 that is fixed to the vibration body 12 with the adhesive and also mechanically fixed to the vibration body 12 is tightened such that the inclined surface 1 at the outer peripheral edge of the cover glass 11 and the inclined surface 3 of the retainer 13 face each other and come into contact with each other. After that, the adhesive 16 is cured. As a result, a vibration device with the above-described structure is obtained.

According to the vibration device 10, as illustrated in FIG. 1A and FIGS. 5A and 5B, the cover glass 11 is strongly pressed against the vibration body 12 by the retainer 13, and this results in sufficient integration of the cover glass 11 and the vibration body 12, so that vibration propagation loss was able to be reduced or prevented.

Figure 4:
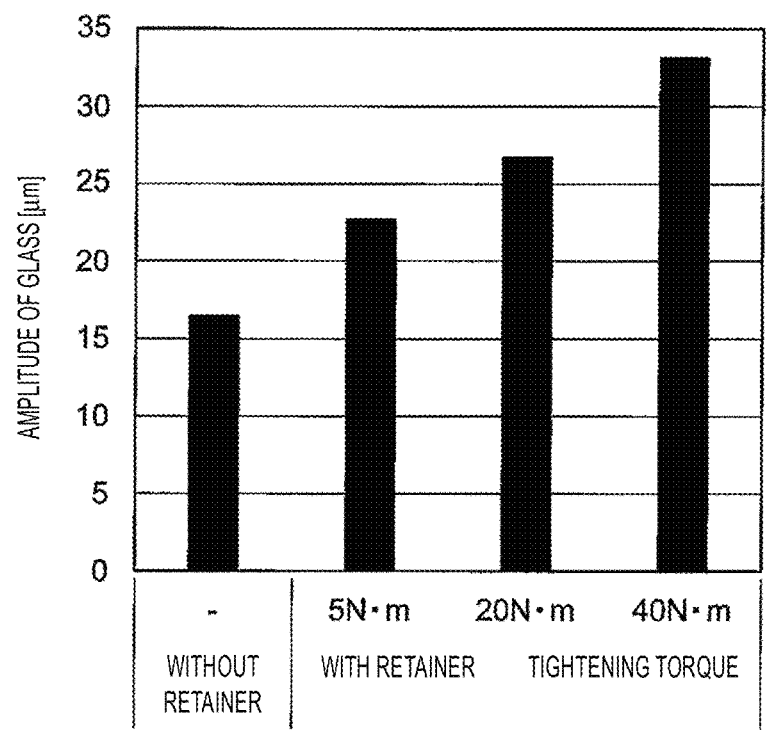
FIG. 4 is a graph illustrating amplitude values of the cover glass depending on the presence or absence of a retainer and variations in a tightening torque in the vibration device according to the first preferred embodiment of the present invention.

FIG. 4 is a graph illustrating results showing amplitude values of the cover glass 11 when prototypes are manufactured by providing and not providing the retainer 13 and by changing the tightening torque of the retainer in the vibration device according to the first preferred embodiment. First, a sufficient amplitude was not obtained without the retainer. In addition, it is understood that the higher the tightening torque, the higher the amplitude of the cover glass. In other words, the higher the tightening torque, the more securely the cover glass and the vibration body are held and that vibration propagation loss is reduced.

Note that the adhesive 16 is injected not only into the space between the cover glass 11 and the vibration body 12 and the space between the retainer 13 and the cover glass 11, but also into the threaded portion 17a of the retainer 13 and the threaded portion 17b of the vibration body 12 so as to also prevent loosening of the threaded portions 17a and 17b. In the related art, the adhesive 16 only bonds two components together. In contrast, a feature of the adhesive 16 in the first preferred embodiment is that the adhesive 16 also has a function of integrating two components together by accommodating irregularities of the two components.

First Modification

Figure 6A:
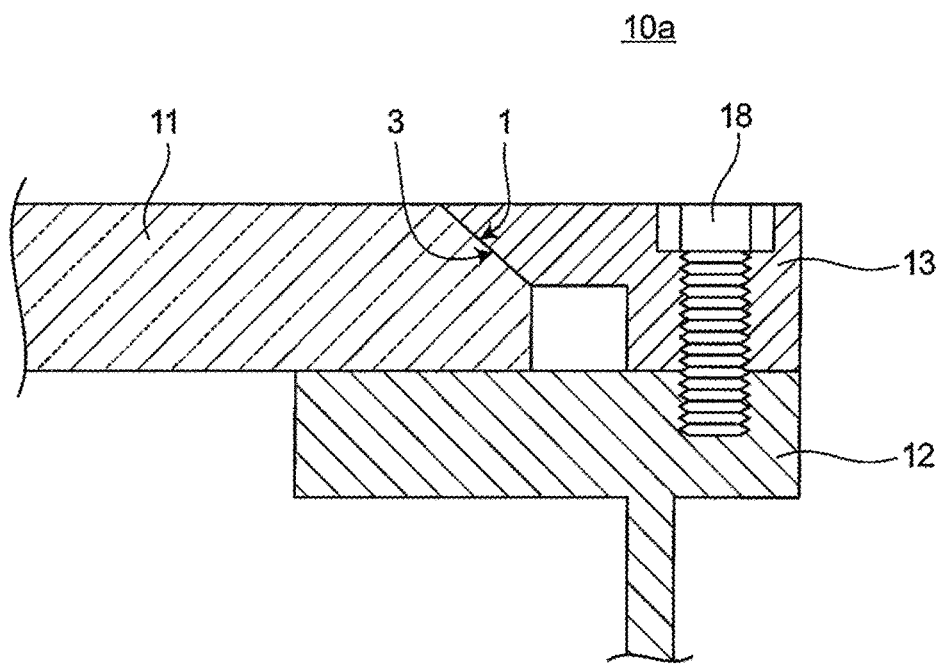
FIG. 6A is a schematic partial sectional view of a sectional structure of a vibration device according to a first modification of the first preferred embodiment of the present invention including an end portion of a cover glass, an end portion of a vibration body, and an end portion of a retainer.
Figure 6B:
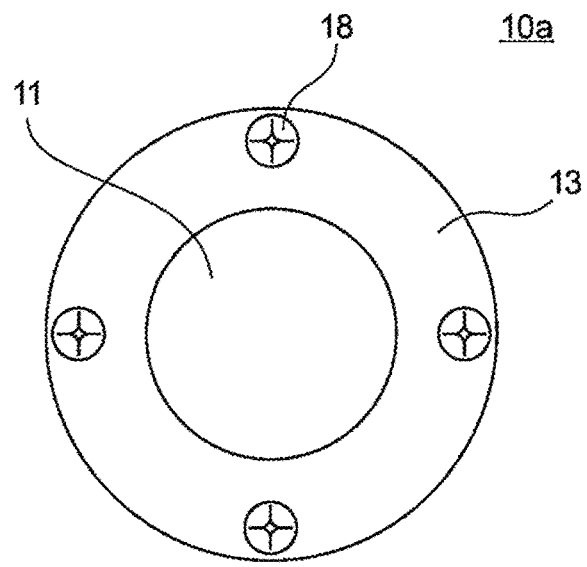
FIG. 6B is a plan view of the vibration device illustrated in FIG. 6A.

FIG. 6A is a schematic partial sectional view of a vibration device 10a according to a first modification of the first preferred embodiment including an end portion of the cover glass 11, an end portion of the vibration body 12, and an end portion of the retainer 13. FIG. 6B is a plan view of the vibration device 10a illustrated in FIG. 6A.

When comparing the vibration device 10a according to the first modification and the vibration device according to the first preferred embodiment, the difference is that the vibration body 12 and the retainer 13 are mechanically fixed to each other by screws 18, instead of cutting threads on the vibration body 12 and the retainer 13. In this case, threaded holes extend from the top surface of the retainer 13 toward the vibration body 12. As illustrated in FIG. 6B, the number of threaded holes are, for example, four. However, the number of threaded holes is not limited to four and may be two or more, for example, and the threaded holes may be provided in a rotationally symmetric manner. As a result, compared with the case of cutting threads on the vibration body 12 and the retainer 13, the vibration body 12 and the retainer 13 can be mechanically fixed to each other more easily at a lower cost.

Second Modification

Figure 7A:
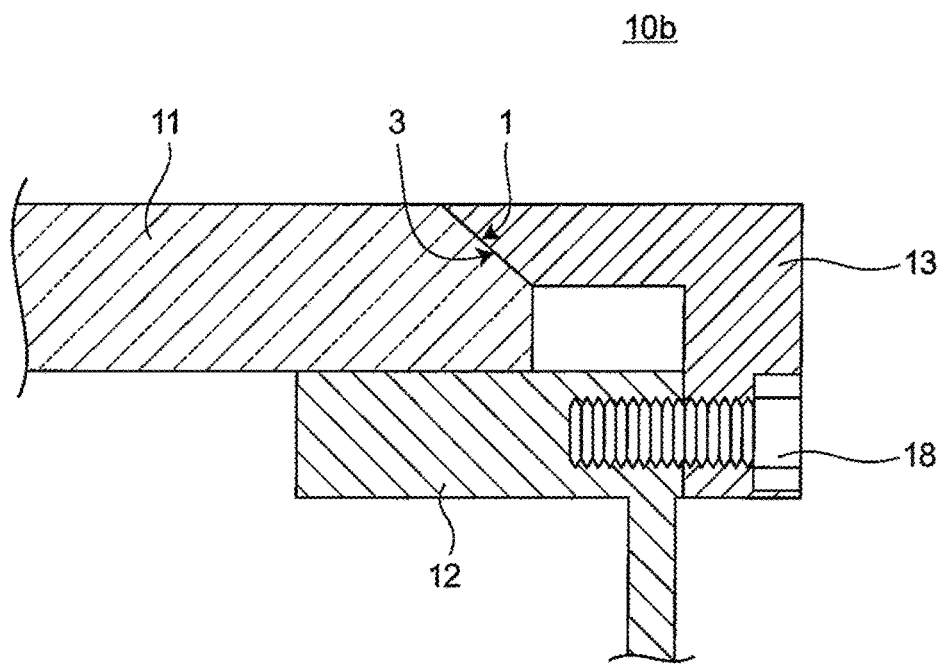
FIG. 7A is a schematic partial sectional view of a sectional structure of a vibration device according to a second modification of the first preferred embodiment of the present invention including an end portion of a cover glass, an end portion of a vibration body, and an end portion of a retainer.
Figure 7B:
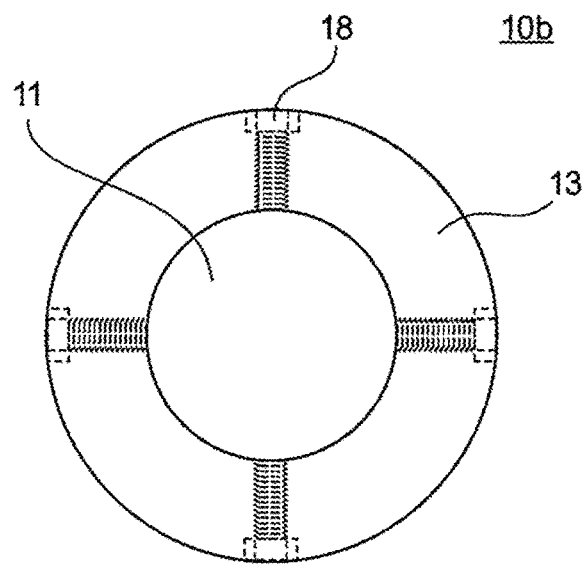
FIG. 7B is a plan view of the vibration device illustrated in FIG. 7A.

FIG. 7A is a schematic partial sectional view of a vibration device 10b according to a second modification of the first preferred embodiment including an end portion of the cover glass 11, an end portion of the vibration body 12, and an end portion of the retainer 13. FIG. 7B is a plan view of the vibration device 10b illustrated in FIG. 7A.

When comparing the vibration device 10b according to the second modification and the vibration device according to the first preferred embodiment, the difference is that the vibration body 12 and the retainer 13 are mechanically fixed to each other by the screws 18 as in the first modification, instead of cutting threads on the vibration body 12 and the retainer 13. In addition, when comparing the second modification and the first modification, the difference is that threaded holes extend from a side surface of the retainer 13 toward the vibration body 12. As illustrated in FIG. 7B, the number of threaded holes are, for example, four. However, the number of threaded holes is not limited to four and may be two or more, for example, and the threaded holes may be provided in a rotationally symmetric manner. As a result, compared with the case of cutting threads on the vibration body 12 and the retainer 13, the vibration body 12 and the retainer 13 can be mechanically fixed to each other more easily at a lower cost.

Third Modification

Figure 8A:
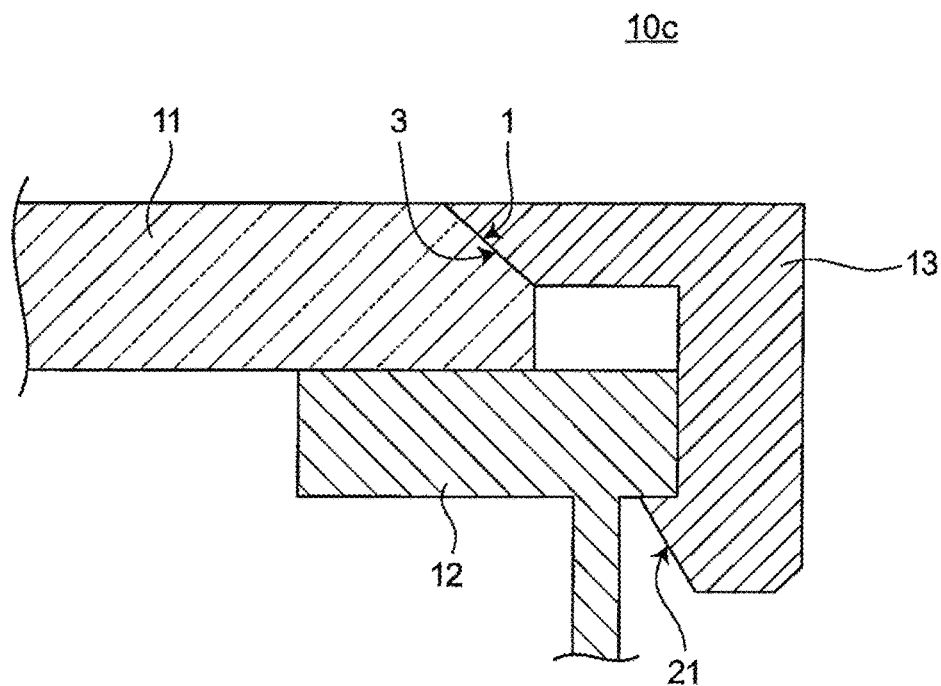
FIG. 8A is a schematic partial sectional view of a sectional structure of a vibration device according to a third modification of the first preferred embodiment of the present invention including an end portion of a cover glass, an end portion of a vibration body, and an end portion of a retainer.
Figure 8B:
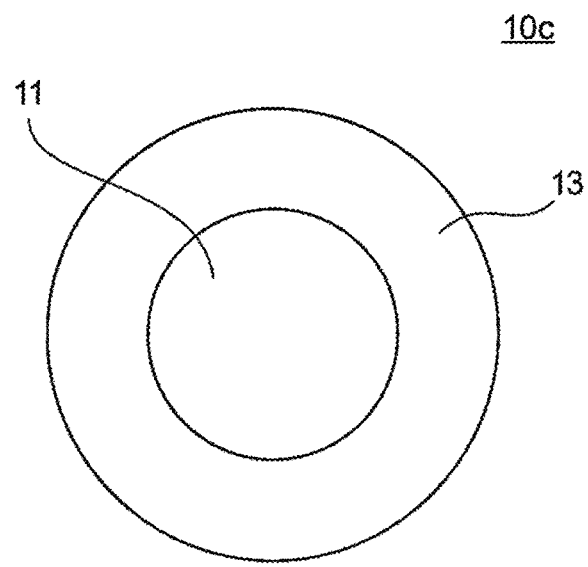
FIG. 8B is a plan view of the vibration device illustrated in FIG. 8A.

FIG. 8A is a schematic partial sectional view of a vibration device 10c according to a third modification of the first preferred embodiment including an end portion of the cover glass 11, an end portion of the vibration body 12, and an end portion of the retainer 13. FIG. 8B is a plan view of the vibration device 10c illustrated in FIG. 8A.

When comparing the vibration device 10c according to the third modification and the vibration device according to the first preferred embodiment, the difference is that the retainer 13 is mechanically fixed to the vibration body 12 by a snap-fit portion 21 of the retainer 13, instead of cutting threads on the vibration body 12 and the retainer 13. As a result, compared with the case of cutting threads on the vibration body 12 and the retainer 13, the vibration body 12 and the retainer 13 can be mechanically fixed to each other more easily at a lower cost.

Fourth Modification

Figure 9A:
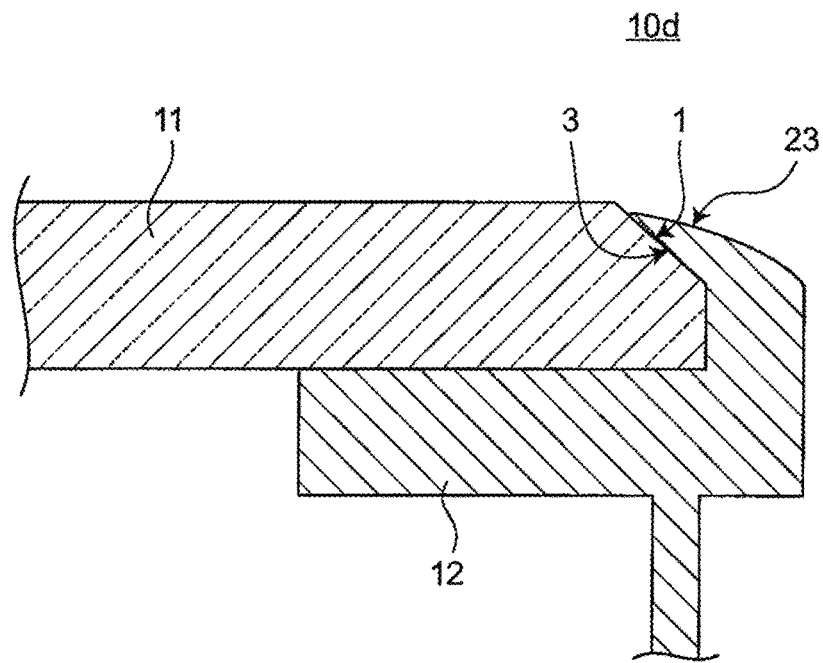
FIG. 9A is a schematic partial sectional view of a sectional structure of a vibration device according to a fourth modification of the first preferred embodiment of the present invention including an end portion of a cover glass and an end portion of a vibration body.
Figure 9B:
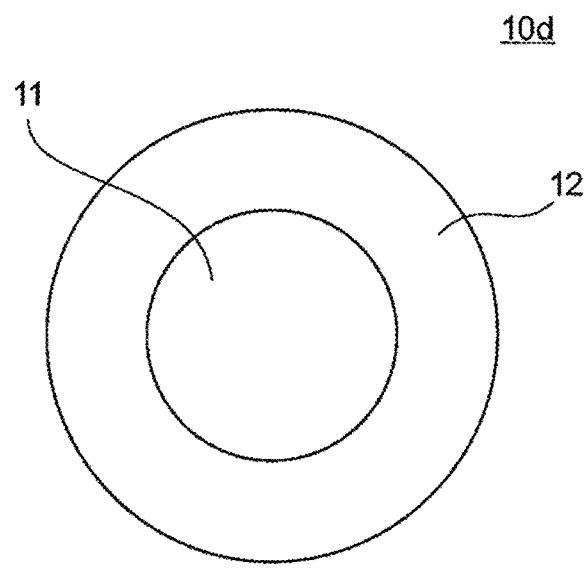
FIG. 9B is a plan view of the vibration device illustrated in FIG. 9A.

FIG. 9A is a schematic partial sectional view a vibration device 10d according to a fourth modification of the first preferred embodiment including an end portion of the cover glass 11 and an end portion of the vibration body 12. FIG. 9B is a plan view of the vibration device 10d illustrated in FIG. 9A.

When comparing the vibration device 10d according to the fourth modification and the vibration device according to the first preferred embodiment, the difference is that the vibration body 12 and a retainer are integrally provided. More specifically, an upper portion of the vibration body 12 includes a retainer portion 23 with the inclined surface 3, which corresponds to the inclined surface 1 at the outer peripheral edge of the cover glass 11. The retainer portion 23 may press and support the cover glass 11 by, for example, a crimped structure fabricated by bending the upper portion of the vibration body 12. The crimped structure can be fabricated by, for example, a method such as thermal crimping or rolling crimping. Note that, similar to the retainer of the third modification, the retainer portion 23 may be a snap fit. As a result, the number of components can be reduced while maintaining the mechanical fixation.

Fifth Modification

Figure 10A:
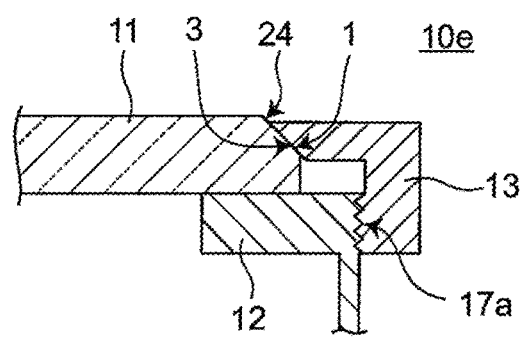
FIG. 10A is a schematic partial sectional view of a sectional structure of a vibration device according to a fifth modification of the first preferred embodiment of the present invention including an end portion of a cover glass, an end portion of a vibration body, and an end portion of a retainer.
Figure 10B:
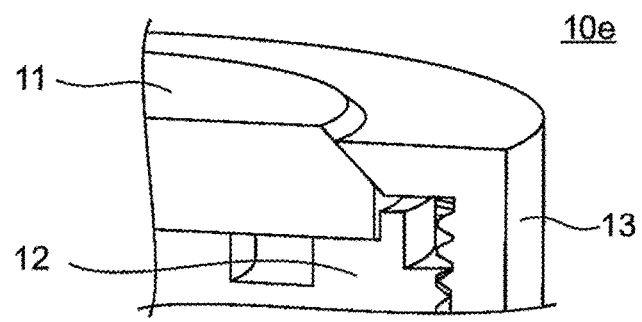
FIG. 10B is a partial sectional perspective view of an end portion of the vibration device illustrated in FIG. 10A.

FIG. 10A is a schematic partial sectional view of a vibration device 10e according to a fifth modification of the first preferred embodiment including an end portion of the cover glass 11, an end portion of the vibration body 12, and an end portion of the retainer 13. FIG. 10B is a partial sectional perspective view of an end portion of the vibration device 10e illustrated in FIG. 10A.

When comparing the vibration device 10e according to the fifth modification and the vibration device according to the first preferred embodiment, the difference is that the cover glass 11 projects further than the retainer 13 does. As a result, waterdrops on the surface of the cover glass 11 smoothly flow from the outer peripheral edge of the cover glass 11 toward the retainer 13, and thus, visual field obstruction due to waterdrops is less likely to occur.

Sixth Modification

Figure 11A:
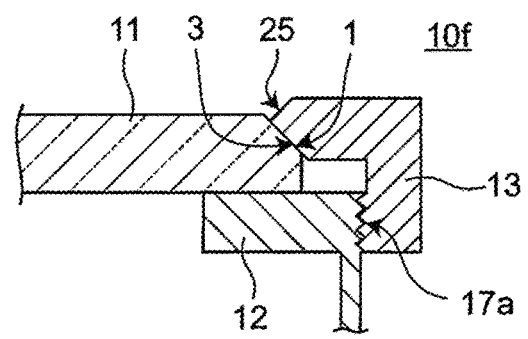
FIG. 11A is a schematic partial sectional view of a sectional structure of a vibration device according to a sixth modification of the first preferred embodiment of the present invention including an end portion of a cover glass, an end portion of a vibration body, and an end portion of a retainer.
Figure 11B:
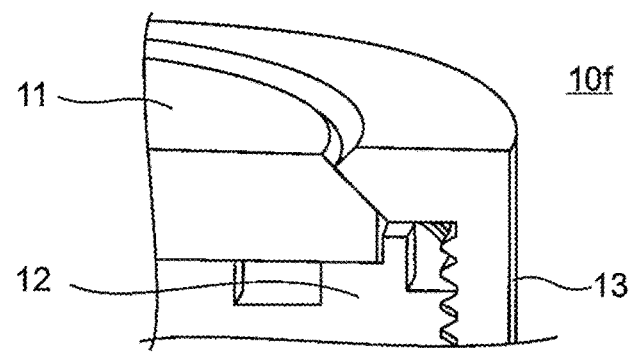
FIG. 11B is a plan view of the vibration device illustrated in FIG. 11A.

FIG. 11A is a schematic partial sectional view a vibration device 10f according to a sixth modification of the first preferred embodiment including an end portion of the cover glass 11, an end portion of the vibration body 12, and an end portion of the retainer 13. FIG. 11B is a plan view of the vibration device 10f illustrated in FIG. 11A.

When comparing the vibration device 10f according to the sixth modification and the vibration device according to the first preferred embodiment, the difference is that the retainer 13 projects further than the cover glass 11 does. As a result, the cover glass 11 is more recessed than the retainer 13, and thus, an object is less likely to come into contact with the cover glass 11, so that the risk of damaging the cover glass 11 is reduced.

Note that the present disclosure includes suitable combinations of arbitrary preferred embodiments and/or examples among the above-described various preferred embodiments and/or examples, and the advantageous effects of each of the preferred embodiments and/or examples can be obtained.

With vibration devices according to preferred embodiments of the present invention, by using an adhesive and mechanical fixation together to fix a cover glass and a vibration body to each other, the cover glass and the vibration body can be securely held, and vibration loss can be reduced or prevented. By mounting this vibration device onto an imaging device, removal of waterdrops can be efficiently performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
   a cover glass including an inclined surface including a chamfered outer peripheral edge of the cover glass;
   a vibration body bonded to the cover glass with an adhesive and causing the cover glass to vibrate; and
   a retainer bonded to the cover glass and the vibration body with an adhesive, the retainer being in contact with the inclined surface of the cover glass so as to support an outer peripheral edge of the cover glass; wherein
   each of the vibration body and the retainer includes a threaded portion; and
   the threaded portions of the vibration body and the retainer are bonded with the adhesive.

2. The vibration device according to claim 1, wherein the retainer includes an inclined surface in surface contact with the inclined surface of the cover glass.

3. The vibration device according to claim 1, wherein the cover glass includes the inclined surface defined by the chamfered outer peripheral edge of the cover glass at an angle from about 5 degrees to about 85 degrees with respect to a horizontal surface.

4. The vibration device according to claim 1, wherein the retainer is a portion of the vibration body.

5. The vibration device according to claim 1, wherein the retainer and the vibration body are fitted to each other, and the cover glass is clamped between the retainer and the vibration body so as to be fixed in place.

6. The vibration device according to claim 1, wherein the retainer is fixed to the vibration body by screw clamping.

7. The vibration device according to claim 1, wherein the cover glass is made of tempered glass.

8. The vibration device according to claim 1, wherein the cover glass includes the inclined surface including the chamfered outer peripheral edge of the cover glass at an angle of about 45 degrees with respect to a horizontal surface.

9. The vibration device according to claim 1, wherein the cover glass is made of at least one of soda glass, borosilicate glass, or aluminosilicate glass.

10. A vibration-device-equipped imaging device comprising:
    an imaging device including an optical element; and
    the vibration device according to claim 1; wherein
    the vibration device is disposed such that a front surface of the optical element of the imaging device is covered with the cover glass of the vibration device.

11. The vibration-device-equipped imaging device according to claim 10, wherein the retainer includes an inclined surface in surface contact with the inclined surface of the cover glass.

12. The vibration-device-equipped imaging device according to claim 10, wherein the cover glass includes the inclined surface defined by the chamfered outer peripheral edge of the cover glass at an angle from about 5 degrees to about 85 degrees with respect to a horizontal surface.

13. The vibration-device-equipped imaging device according to claim 10, wherein the retainer is a portion of the vibration body.

14. The vibration-device-equipped imaging device according to claim 10, wherein the retainer and the vibration body are fitted to each other, and the cover glass is clamped between the retainer and the vibration body so as to be fixed in place.

15. The vibration-device-equipped imaging device according to claim 10, wherein the retainer is fixed to the vibration body by screw clamping.

16. The vibration-device-equipped imaging device according to claim 10, wherein the cover glass is made of tempered glass.

17. The vibration-device-equipped imaging device according to claim 10, wherein the cover glass includes the inclined surface defined by the chamfered outer peripheral edge of the cover glass at an angle of about 45 degrees with respect to a horizontal surface.

18. The vibration-device-equipped imaging device according to claim 10, wherein the cover glass is made of at least one of soda glass, borosilicate glass, or aluminosilicate glass.

* * * * *